United States Patent [19]

Linder

[11] 4,076,954

[45] Feb. 28, 1978

[54] METHOD AND AN ELECTRICALLY HEATED DEVICE FOR PRODUCING MOLTEN METAL FROM POWDERS OR LUMPS OF METAL OXIDES

[76] Inventor: Rolf Linder, Skjutarevagen 7, 77 200, Grangesberg, Sweden

[21] Appl. No.: 690,742

[22] Filed: May 28, 1976

Related U.S. Application Data

[63] Continuation-in-part of Ser. No. 469,983, May 15, 1974, Pat. No. 3,976,472.

[30] Foreign Application Priority Data

May 17, 1973 Sweden .............................. 7307022

[51] Int. Cl.² .......................... H05B 7/18; C21C 5/52
[52] U.S. Cl. ......................................... 13/9 R; 75/11
[58] Field of Search ....................... 75/10–12, 75/34, 42; 13/9

[56] References Cited

U.S. PATENT DOCUMENTS

| | | | |
|---|---|---|---|
| 2,894,831 | 7/1959 | Old ............................................ | 75/26 |
| 2,973,260 | 2/1961 | Nogiwa ..................................... | 75/26 |
| 3,140,168 | 7/1964 | Halley ....................................... | 75/26 |
| 3,224,871 | 12/1965 | Collin ....................................... | 75/34 |
| 3,236,628 | 2/1966 | von Bogdaudy ......................... | 75/42 |

*Primary Examiner*—Peter D. Rosenberg
*Attorney, Agent, or Firm*—Ladas, Parry, Von Gehr, Goldsmith & Deschamps

[57] ABSTRACT

This invention is related to a method and a process for producing metals by reducing and smelting metal oxides in two steps, the first of said steps comprising prereduction of a metal oxide charge. The prereduced metal oxide is transferred directly to the second step comprising final reduction of the prereduced metal oxide in an electrically heated smelting furnace with hydrocarbon containing reducing agent. A cooling agent is injected into the reaction gases evolved from the smelting furnace to cool said gases to a temperature at which they can be transferred directly to the prereduction furnace as a reducing agent without causing sticking of the charge in said furnace. The cooling agent is especially selected so as to increase the molar quantity of reducing gas by chemical or physical interaction with the reaction gas from the smelting furnace.

11 Claims, 4 Drawing Figures

METHOD AND AN ELECTRICALLY HEATED DEVICE FOR PRODUCING MOLTEN METAL FROM POWDERS OR LUMPS OF METAL OXIDES

This is a continuation-in-part of application Ser. No. 469,983 filed May 15, 1974 now U.S. Pat. 3,976,472.

This invention is related to a method and an electrically heated device for producing a liquid metal melt from metal oxides by drying heating, reducing and melting said oxides and the metal prepared by reducing said oxides and in which said oxides may consist of powders or small lumps and the reducing agent essentially consists of highly bituminous coals, oil, tar, pitch, methane or other solid, liquid or gaseous hydrocarbon-containing materials. Coal with low content of volatile constituents may also partly be used as a reducing agent. The apparatus to some extent resembles an electric blast-furnace with an electrically heated hearth and a shaft, rotating furnace or another device for pre-reduction arranged above said hearth.

It is previously known to reduce and melt metal oxides with a reducing agent which essentially consists of coal or coke in electric furnaces with a high or low shaft. When said shaft is high, it is necessary to use a charge consisting of lumps, i.e. lump ore or agglomerates such as pellets or sinter in order to achieve acceptable gas penetration and distribution. Under said conditions and for the same reason the reducing agent must consist of so-called metallurgical coke with high strength. The request for using the metal oxide as well as the reducing agent in the shape of lumps causes additional costs, which are so high that said electric furnaces, e.g. of the Elektrometall type, are not economically competitive compared with other reducing and melting furnaces, e.g. conventional blast-furnaces. When using a low shaft, the requests as regards particle size and physical strength of the charge are lower, but are still present, and simultaneously the indirect reduction with gas in the shaft is considerably reduced, which causes an increase of the consumption of electric energy in the lower part of the furnace. Since carbon is used as the essential reducing agent, the quantity of reducing gas emanating from the end reduction part is insufficient for achieving a high degree of reduction of the metal oxide before said oxide is added to the electrically heated part of the furnace in which the final reduction and melting is performed. Said simultaneously occurring final reduction and melting of the metal oxide (MeO) with direct consumption of carbon (C) is usually called "smelt reduction," in which process carbon monoxide is evolved according to the reaction formula:

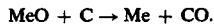

$$MeO + C \rightarrow Me + CO.$$

The consumption of electric energy in said furnaces amounts to about 2000 kWh/ton metal.

In the so-called Lubatti-furnace fine-grained metal oxide mixed with carbon is placed in a layer above the layers of molten metal and slag in an electric melting furnace without regular shaft. The heat energy for reduction is released by passing an electric current from submerged electrodes through the slag layer. The evolved carbon monoxide only exercises a slight reducing effect due to the fact that the residence time for passing through the layer of metal oxide is very short. Also in this case the quantity of evolved carbon monoxide is relatively small. In said type of furnace the electric energy consumption amounts to about 2500 kWh/ton metal and the productivity therefore is relatively low.

Furthermore, there are a number of systems in which the final reduction is performed in electric furnaces of the type previously described (Tyseland-Hole, etc.) of a metal oxide which is reduced in advance with solid fuel in rotating furnaces which are heated by burning the carbon monoxide emanating from the electric furnace. Said systems are characterized by a high total energy consumption and require additional investments for rotating furnaces. The drawbacks of the systems described above for reducing metal oxides can be summarized as follows:

a. When using a high shaft for achieving good indirect reduction it is necessary to use agglomerated metal oxide and coke with good strength characteristics.

b. When using a lower shaft the requests on the strength of the agglomerates and the reducing agent are decreased, but the indirect reduction with gas is low and the electric energy consumption is correspondingly high.

c. When working without a shaft, e.g. in a furnace of the Lubatti type, the consumption of electric energy is increased further and amounts to about 2500 kWh/ton of metal. The productivity in said type of furnace is low.

d. In all previously tried furnace types carbon is used as reducing agent, which means that the quantity of gas available for prereduction is about half the quantity which could be obtained if oil ($CH_2$) could be used. If methane ($CH_4$) can be used, the quantity of reducing gas is about three times as large as when using carbon.

It is a purpose of this invention to avoid said drawbacks and decrease the costs for preparing the molten metal by using oil or other materials with a high content of hydrocarbon, such as solid carbonceous materials with a high content of volatile constituents, and also gaseous reducing agents, such as natural gas, methane, $CH_4$, as reducing agent and to use simultaneously the mixture of carbon monoxide and hydrogen evolved from the electrically heated smelt reduction section in a rational manner for pre-reducing the metal oxide in a vertical multiple-hearth furnace, rotating furnace or other suitable device arranged above the smelt-reduction hearth.

The reducing agent may also in addition to oil or gas comprise a certain amount of other carbonaceous materials, such as coal or coke dust, bituminous coal, etc. Preferably the total atomic ratio of C/H of the reducing agent should not exceed 1:0.5 especially not exceed 1:1.0–1.2 and especially not exceed 1:1.4–1.5 corresponding to a content of solid carbon in carbonaceous materials or such materials mixed with oil of at most 70% at most 50–40% resp. at most 30–25% of said mixture. Such ratio may be accomplished with only solid materials with a high content of volatile materials.

The energy required in the smelt-reduction section is mainly or entirely supplied as electric energy, preferably by passing an electric current through the layer of pre-reduced metal oxide and reducing agent or cracking products of the reducing agent floating on or mixed with the layers of slag and metals which occupy the rest of the hearth. In the Lubatti furnace the electric current is passed through the slag layer, and this may also in the process of this invention be a suitable manner for supplying a larger or smaller part of the resistance heat energy required for the work of reduction. The principle of this invention does not exclude the possibility of passing some part of the electric current also through the layer of molten metal below the slag layer, (where it also might be generated through suitable induction coils). The electric energy is supplied e.g. through water-cooled metal electrodes of suitable construction which are submerged to a certain depth into the various layers to achieve in this way a suitable distribution of the electric current. When the electrodes consist of carbonaceous material also electric arcs might be formed and the electrodes are consumed at a rate which is normal for such furnaces. This is, however, no larger disadvantage since said types of electrodes can be fed continuously into the furnace and simultaneously the consumed carbon participates in the process as a reducing agent. The temperature in the electrically heated furnace section should be sufficiently high so that the slag as well as the metal or the carbon-containing alloy formed from said metal are highly fluid and can be tapped from the furnace without difficulty batchwise or continuously. The temperature in the layer of pre-reduced metal oxide and reducing agent must also be sufficiently high so that the end reduction in said part occurs rapidly. It is a further request that the temperature in said layer is above the melting point of the formed, especially carbon-containing metal alloy and slag, respectively. In order to obtain a slag with a suitable viscosity value and sulphur removing effect it is suitable to add lime in the smelt-reduction section. When using oil as hydrogen-containing reducing agent, the reducing agent (oil or e.g. an emulsion of coal in oil) is injected, optionally after preheating, from conventional tanks or containers with pumps directly on the layer of pre-reduced hot metal oxide floating on the slag in the furnace through nozzles arranged in the roof or sides of the smelting furnace section. Optionally a part of the oil may be injected below the surface of the molten slag or metal. The result is an instantaneous cracking of the oil so that some destillation products and gaseous cracking products are evolved and are carried with the gas emanating from the reduction process into the pre-reduction furnace. Said part of the process may contribute to essential inventive characteristics, i.e. to a reduction the temperature of the gases passing into the pre-reduction furnace to a level below the temperature at which the pre-reduced and probably metalcoated metal oxide particles stick together and agglomerate and also to an increase of the volume of the reducing gas evolved from the smelting furnace section to make said volume sufficient for the required pre-reduction in the pre-reduction section. When the gas temperature is too high, the pre-reduction furnace can be blocked entirely. For controlling such phenomenons in a satisfactory manner this invention comprises reducing the temperature of the gas evolved in the smelting furnace to a level at which over-heating and sticking is avoided in the pre-reduction furnace. Simultaneously it is usually preferable to keep the temperature of the gas as high as possible. When reducing iron ore the suitable gas temperature is normally within the range 700° to 1200° C and preferably 800° to 1,000–1,100° C. The necessary temperature reduction of the gas evolved from the smelting furnace usually is about 100° to 900° C and especially about 200° to 600° C. Said temperature reduction can according to the invention be achieved by the introduction of water, water vapour, carbon dioxide ($CO_2$) hydrocarbons with or without addition of air or other cooling, liquid or gaseous agents into the gas which passes from the smelting furnace and is introduced into the pre-reduction furnace. In this manner it is possible to control closely the temperature of the gas which is introduced into the lower part (discharge end) of the pre-reduction furnace and simultaneously the gas volume available for reduction is increased. Said materials can also be injected onto the metal oxide layer or optionally be mixed with the reducing agent before it is added to the smelting furnace. At the temperatures in question, usually within the range 1100° to 800° C the equilibrium of the water-gas reaction is obtained rapidly. This addition of cooling agent to the gases which are evolved from the smelting furnace simultaneously by energy transformation and reactions gives an increase of the volume of reducing gases which are transferred to the pre-reduction section. This is an essential part of the idea of invention since said effect makes certain that the volume of reducing gas which is required for the pre-reduction is reliably produced. Another possible method for achieving a temperature reduction of the gas before the introduction into the reduction shaft is to substitute the addition of e.g. lime mentioned above, which is requested for the formation of slag, with materials which are decomposed with formation of e.g. carbon dioxide or water, such as limestone ($CaCO_3$). Thermal decomposition to CaO and $CO_2$ is then obtained in the reduction layer with energy consumption. The evolved carbon dioxide will, however, partly react with carbon from the reducing agent with formation of CO, and therefore also said method can be used for increasing the volume of CO supplied to the shaft. For obtaining a high pre-reduction rate and a good heat supply to the shaft the inlet gas temperature should, however, be kept as high as possible without causing difficulties with sticking or agglomeration of the charge. The pre-reduction shaft, which may have the shape of an empty cylindrical space in which the ore particles are reduced when falling down the shaft, may also according to one possible embodiment consist of a device which resembles a multi-hearth furnace. The pre-reduction shaft may be provided at the lowermost part with suitable means for distributing the produced pre-reduced metal oxide over a large part of the entire surface of the underlying smelt-bath surface. Said device may consist of simple tubes which distribute the material over the furnace area, but it may also consist of e.g. a rotating disc which distributes the particles circularly over the bath area. Reciprocating rakes may also be used in combination with the embodiments disclosed above. The pre-reduction furnace is constructed with an effective vertical extension and a number of hearths which permit a satisafactory use of the heat content and reducing power of the available reducing gases. It is known that many metal oxides comparatively rapidly can be reduced with gas to 50–70%, whereas further reduction occurs increasingly slowly, since a metal layer formed on the surface of the particles slows down further transport of oxygen. In a furnace according to the invention it is sufficient e.g. when reducing iron ore to obtain a degree of pre-reduction of 20–80%, preferably 40–60%, e.g. 50%. When the reduction is carried out further, the volume of reducing gases evolved from the smelting furnace will be decreased.

The part of the total reduction work which is performed in the pre-reduction furnace is mainly performed with the reducing temperature-adjusted gases transferred from the smelt-reduction furnace. A minor part, normally up to 10–30% of the reduction work may be performed with other reducing agents, e.g. solid reducing agents, such as bituminous coal, breeze, etc., which may be mixed into the charge, preferably after a pre-heating treatment. A certain degree of balance between available and necessary reducing gas volume will automatically be achieved.

The reactions of the gas-reduction are normally endothermic, i.e. require heat, and therefore it is necessary for achieving a balance between required and available heat energy to dry and preheat the metal oxide (ore) before introducing it into the pre-reduction furnace. The maximum pre-heating temperature is normally determined by the tendency of the charge to stick or agglomerate. For iron oxide the temperature is usually 800° to 1100°-1200° C.

This is achieved according to the invention by using the remaining physical and chemical heat in the reduction gas effluent. Said gas is burnt with air which is injected into the gas through suitably arranged nozzles or conduits. It is within the scope of the invention to perform the preheating in the multiple-hearth furnace in which the pre-reduction is carried out or in a separate device, such as a rotating furnace of conventional construction, from which the dried and preheated metal oxide is delivered to the intake opening of the pre-reduction furnace. In the former case nozzles for introducing combustion air are arranged at a suitable level in the pre-reduction furnace regularly distributed around the shaft. Said air may be preheated in an air preheater arranged outside the shaft, using the remaining physical heat in the gases escaping from the preheating part of the pre-reduction shaft. The heat content of the off-gases may optionally also be recovered in a waste gas boiler. The waste gas should finally be subjected to a dust-removing treatment in an electrofilter before being discharged to the atmosphere. Purification in a cyclon before the heat exchanger or waste gas boiler may also be required. The metal oxide is fed to the drying and preheating section with a feeder of conventional construction at an even and controlled rate from bins or containers of conventional construction.

The particle size of the ore may vary within relatively broad limits. The size should be large enough to prevent excessive dust losses and sintering and small enough to give the necessary degree of pre-reduction. The maximum size also depends on the porosity, the maximum size of a more porous or easily reducible ore being larger. A normal size of solid iron ore is 0.1 to 15 mm and especially 0.1 to 8 mm. When producing iron a preferred starting material is iron oxide, such as hematite or magnetite, which in the pre-heating step is partly or entirely oxidized to $Fe_2O_3$.

Figure 1:
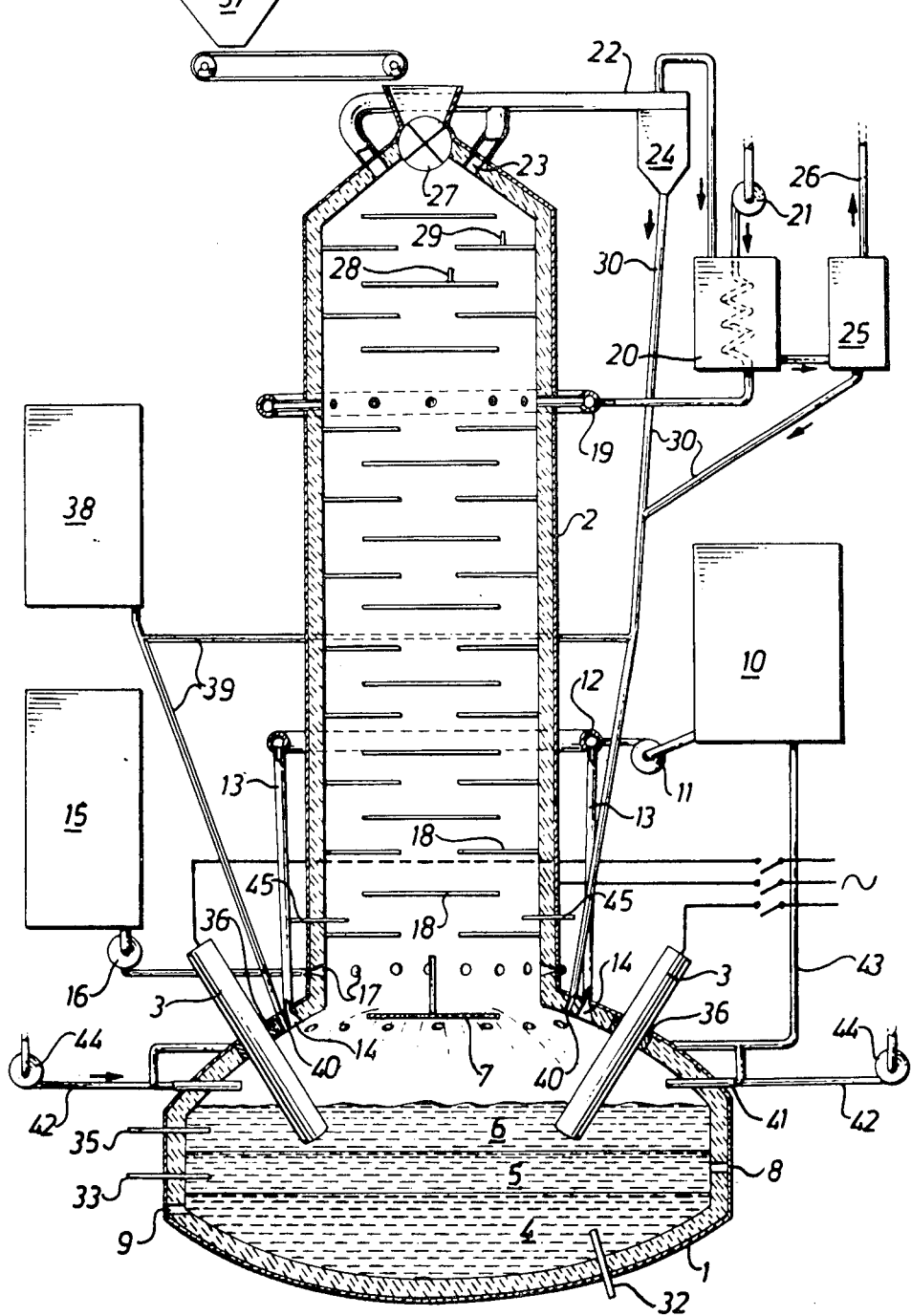
FIG. 1 is a partial vertical sectional view of an apparatus for producing molten metal from powders or lumps of metal oxides constructed in accordance with the present invention.

An embodiment of the apparatus is disclosed in the enclosed FIG. 1 and explained with an example of the use of said apparatus for producing a carbon-containing molten iron melt from iron ore concentrate with oil as reducing agent and graphite electrodes for supplying electric energy to the reaction layers, in which the end reduction is carried out. The apparatus comprises a circular melting and reduction furnace 1 with a suitable refractory ceramic lining, which is provided with a roof through which three or more electrodes 3 are inserted through water-cooled, tightly sealing sleeves. The electrodes are connected to the electric power net 44. The electrodes reach down into or through the final reduction layer 6, floating on the slag layer 5, which floats on the metal layer 4. The boundary between the layers 6 and 5 is not necessarily sharp, and reduction can be maintained also if there is a certain degree of mixing of said layers. The furnace is provided with tapping openings 8 and 9, through which slag and molten metal, respectively, can be tapped continuously or at intervals. The temperature in the metal, the slag and the reaction layer is measured and controlled with thermocouples 32, 33 and 35. Centrally above the melting furnace there is arranged a multiple-hearth reduction furnace provided with rotating rakes 28, 29, which bring the ore concentrate to fall from hearth to hearth down to hearth 18 said ore concentrate passing in countercurrent to the reducing gases and being pre-reduced by said gases. From the last stage the ore concentrate falls down on a rapidly rotating perforated distributor 7 spreading the ore concentrate circularly over the reaction layer 6.

Figure 2:
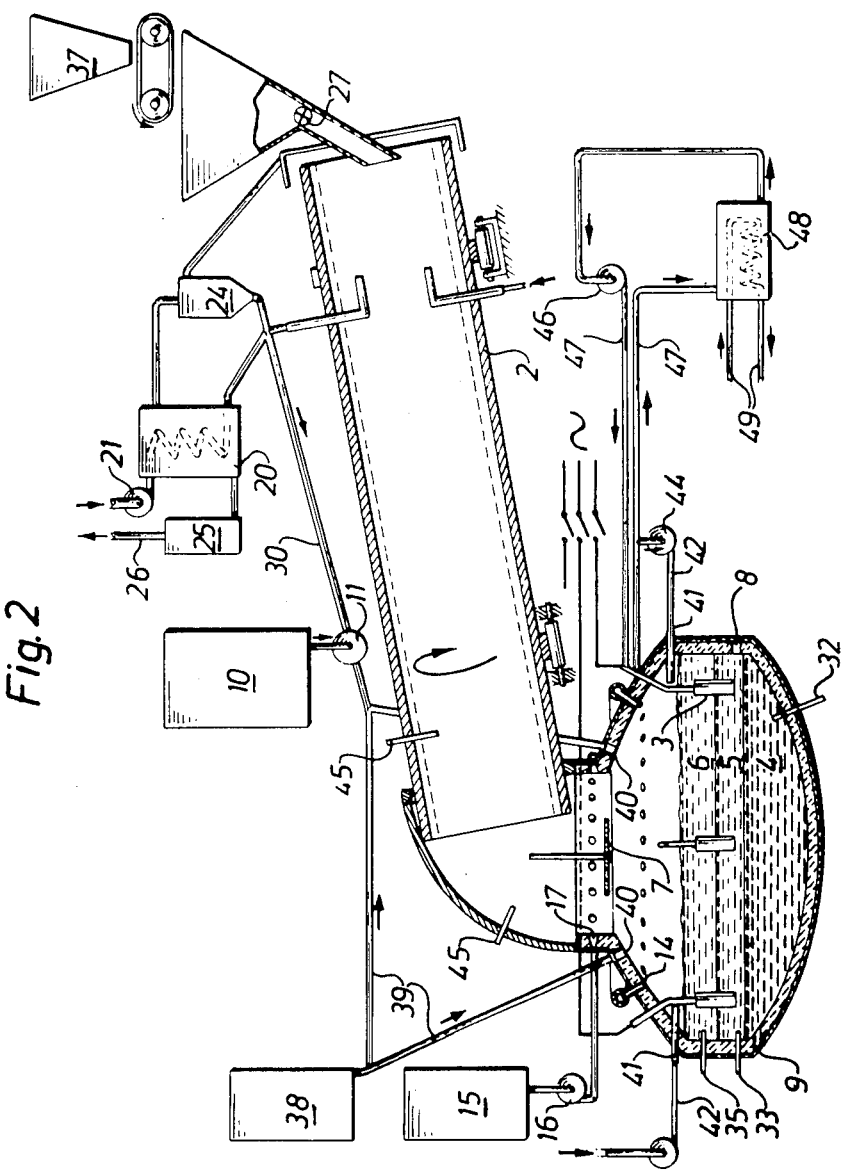
FIG. 2 is a partial vertical sectional view of a further embodiment of the apparatus of the present invention.

Reducing agent consisting of oil is added to the reaction layer 6 from container 10 to a pump 11 and a circular conduit 12 through tubes 13 to nozzles 14, which are arranged regularly distributed in the roof around the shaft. From a container 15 a liquid or gaseous cooling agent is introduced through a pump (fan) 16 and nozzles 17 into the lower part of the pre-reduction shaft. In the upper part of said pre-reduction shaft combustion air is introduced at a suitable level from a circular conduit 19, which is fed from a heat exchanger 20 through a fan 21. The waste gases from the shaft are introduced into the heat exchanger 20 through a conduit 22, which is connected to a number of regularly distributed gas escape openings 23 in the uppermost part of the shaft. In said part there is arranged a suitable lock feed device 27 for feeding wet and cool ore concentrate, said device being shown in the figure as a rotating powder lock valve. To said lock valve the ore concentrate is fed from a container 37 by means of a band conveyor. The waste gases before being introduced into the heat exchanger pass through a dust-removing cyclon 24 and an electrofilter 25 and are finally discharged to the atmosphere through a chimney 26. The dust removed in the gas purifying step is returned through a conduit 30 and inlet opening 40 to the smelting furnace section. Lime or limestone is also introduced into said furnace section from a container 30 and a conduit 39, preferably through the same inlet openings in the roof 40. When starting the apparatus, the smelting furnace as well as the multiple-hearth furnace must be suitably preheated, which is performed with oil burners 41, to which oil is fed from the tank 10 through a conduit 43 and air from a fan 44 through conduits 42. The temperature of the reducing gas evolved from the smelting furnace is controlled with thermocouples 45 arranged in the lower part of the shaft furnace. The temperature values measured by said thermocouples are used for automatically controlling the quantity of cooling agent added, so that the addition through the nozzles 17 is lowered when the temperature is below the selected value. When the temperature is too high, the quantity of cooling agent fed is automatically increased. On FIG. 2 there is disclosed another embodiment in which water-cooled metal electrodes 3 are used in the smelting furnace, and the pre-reduction and preheating is performed in a rotating furnace 2 of conventional construction. The reference numerals correspond to the numerals of FIG. 1, but the apparatus on FIG. 2 also comprises a device for supplying cooling water to the electrodes. Cooling water of boiler quality is passed to and from the electrodes 3 through conduits 47 with a pump 46 which also forces the water through a cooler 48, in which external water from a conduit 49 is used for cooling.

Figure 3:
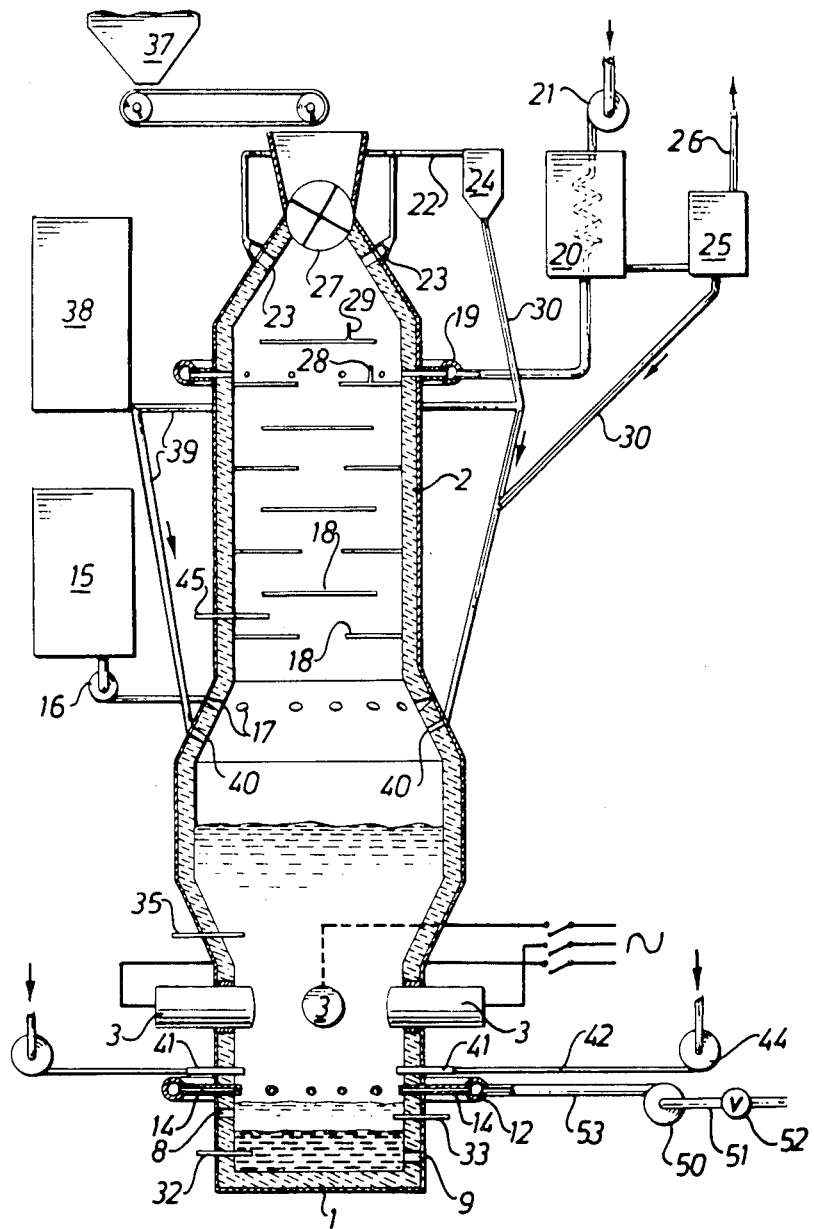
FIG. 3 is a partial vertical sectional view of yet another embodiment of the apparatus of the present invention.

FIG. 3 discloses an embodiment in which methane and/or liquid hydrocarbons is injected at a low level above or into the slag layer for forming an emulsion of slag, metal and iron oxide, which is heated by electric arcs extending between electrodes inserted into the shaft. On said FIG. 12 is an annular conduit 53 from a fan 50 which through a conduit 51 and valve 52 is connected to an external natural gas conduit. In an other embodiment the pre-reduction furnace comprises one or more fluidized beds or cyclon furnaces preferably arranged above the smelt reduction furnace. The reducing gases derived from the smelt reduction furnace are given a pressure high enough to create the desired agitation of the metal oxide in the pre-reduction furnaces.

When reducing an ore which has a tendency to become sticky at a very low temperature, e.g. below 800° C and especially below 600° C it may be necessary to divide the cooling treatment of the gases emanating from the melting furnace in two separate stages in which cooling from the high temperature to an intermediate temperature is performed by injecting a cooling agent, usually $H_2O$ or $CO_2$ which reacts with the hydrocarbons in the effluent gas from the melting furnace in an endothermic cooling reaction with formation of an increased molar amount of reducing gas. When the gas temperature by this cooling treatment is reduced to such a low level that further addition of $H_2O$ and $CO_2$ would decrease or completely eliminate the reducing power of the gas further cooling of the gas must be performed by a physical cooling effect. For this purpose two methods are preferred either alone or in combination. According to the first method the final cooling to the desired working temperature in the pre-reduction step is obtained by injection of a cool but chemically neutral agent, e.g. nitrogen ($N_2$) or methane ($CH_4$) or an other gaseous or liquid hydrocarbon so that the desired lower temperature of the gas is obtained by a calorimetric mixing effect (dilution with a cooler neutral agent). Dilution with a neutral agent decreases the reducing power of the gas insignificantly or not at all, and when using methane or another hydrocarbon as cooling agent the reducing power may also be increased and the heat content of the hydrocarbons may be recovered in a subsequent process stage or in a waste gas boiler in which final burning of the waste gas i performed. According to the other method the final cooling of the reducing gas to the desired working temperature in the pre-reduction stage can be achieved by increasing unavoidable heat losses to the surroundings. This can be achieved with water cooled coils arranged in the flow path of the gas so that heat is removed from the gas to the cooling water. In order to decrease heat losses from the system said cooling should preferably be performed with feed water for the waste gas boiler or with vapour from said boiler (or an other vapour source) as cooling agent in which case the cooling coil acts as an economizer or super-heater. Alternatively said cooling can be performed with the air of combustion which is supplied to a pre-heating furnace used for pre-heating the metal oxide used as feed material in the process. Said supplementary non-endothermic or physical cooling can be achieved by a combination of the measures stated above, i.e. injection of a neutral cooling agent and arranging a cooling coil in the gas flow path. If a cooling coil is arranged in the gas flow path it may be preferable to arrange the discharge of pre-reduced metal oxide to the melting furnace so that the pre-reduced metal ore does not come into direct contact with the cooling coil which could cause wear problems and heat looses from the metal oxide which basically is unsuitable.

Figure 4:
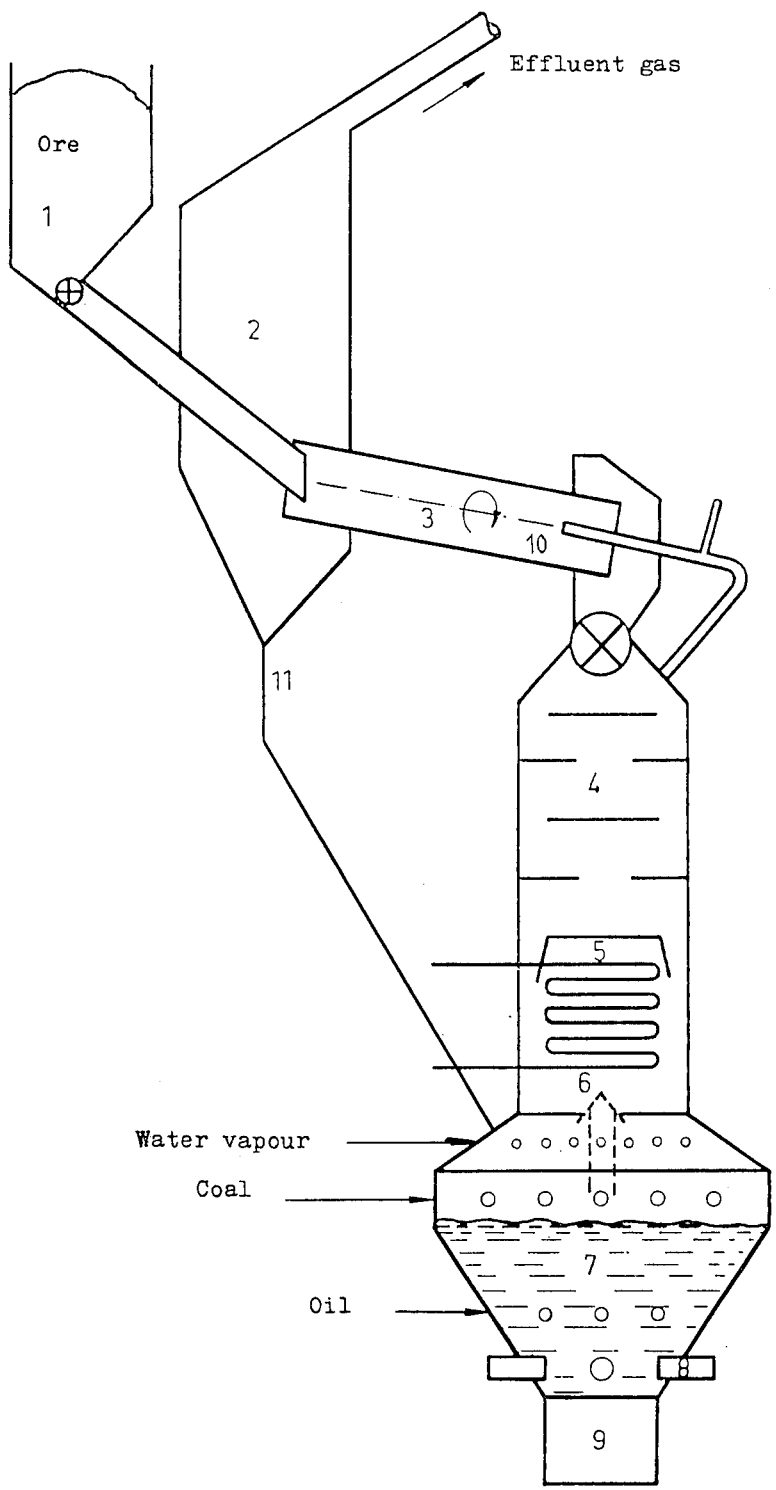
FIG. 4 is a schematic representation of still yet another embodiment of the apparatus of the present invention.

FIG. 4 discloses an embodiment of the furnace according to FIG. 1 which is provided with a separate heat exchanger for a supplementary final cooling of the reducing gas in the manner stated above when treating an ore which becomes sticky at a very low temperature. FIG. 4 discloses a plant comprising a bin 1 for metal ore (concentrate), a waste gas boiler 2, a rotating furnace 3 for drying the metal ore, a multiple hearth furnace 4 for pre-reduction, a heat exchanger 4 for final cooling of the gas, a cooling zone 6 for injection of water vapour, a zone 7 for reaction in emulsion in a melting furnace, electrodes 8 and a space 9 for slag and metal. The plant also comprises a burner 10, for spent reducing gas and a re-circulating conduit 11 for re-circulating dust from the waste gas.

A calculation of the material and heat balances of the various furnace sections when running the apparatus with highly concentrated magnetite the various reducing agents gives per ton of molten metal the consumption of reducing agent and electric energy stated below:

| Reducing agent | coal | oil ($CH_2$) | methane ($CH_4$) |
|---|---|---|---|
| kg/ton of liqu. iron | 244 | 200 | |
| $Nm^3$/ton of liqu. iron | | | 314 |
| Electric energy kwh/ton of liqu. iron | 875 | 1080 | 1050 |

If a cooling agent consisting of liquid water is added so that the temperature of the reducing gases at the inlet to the pre-reduction shaft is reduced to 900° C, so that sticking is avoided, and if simultaneously the concentrate in the upper part of the shaft is preheated to about 1100° C, the available heat is sufficient for covering the heat requirement for reduction of the iron oxide to 50%, i.e. each mole of $Fe_3O_4$ is transformed into 1 Fe + 2 FeO. The gas composition at the inlet to the shaft is in percent by volume:

| gas composition % by volume | Reducing agent | | |
|---|---|---|---|
| | Coal % | oil % | methane % |
| CO | 38,4 | 33,7 | 21,7 |
| $CO_2$ | 6,2 | 4,6 | 2,9 |
| $H_2$ | 44,7 | 50,8 | 62,6 |
| $H_2O$ | 10,7 | 10,9 | 12,8 |

The gas therefore is sufficiently reducing for transforming FeO into Fe. In the upper part of the shaft immediately before the air injection the gas composition is in percent by volume:

| Gas composition | Reducing agent | | |
|---|---|---|---|
| % by volume | coal % | oil % | methane % |
| CO | 18,4 | 20,3 | 16,7 |
| CO₂ | 26,2 | 18,0 | 7,9 |
| H₂ | 33,0 | 26,0 | 42,9 |
| H₂O | 22,4 | 35,7 | 32,5 |

The gas thus is sufficiently reducing for transforming $Fe_3O_4$ into FeO in the initial stage. The remaining physical and chemical heat in the reducing gas immediately before the air injection is sufficient for drying the ore concentrate (based on 3% moisture content) and heating to about 1100° C.

The waste gas escaping from the shaft has furthermore a certain residual heat content, which can be used for preheating the combustion air and for generating electric energy in a waste gas boiler.

A schematic economic calculation is here given as a comparison with the conventional blast-furnace. If it is supposed that for the same capacity the investment costs, the labour costs and the maintenance costs are equal, there is when using water-cooled metal electrodes only a difference as regards fuel and energy costs, whereas the costs for agglomerating the concentrate must be added to the blast furnace costs.

The method according to the invention saves investments costs for an agglomerating plant as well as a coke oven plant. A calculation of costs gives the following results.

| Blast furnace | Sw.Crs./ton liquid iron |
|---|---|
| Coke 0.5 ton at 180 Sw.Crs./ton | 90 |
| sintering 1,6 tons of ore concentrate at 11 Sw.Crs./ton (inclusive limestone) | 18 |
| | 108 |
| Additional investment costs for sintering plant and coke oven plant | 30 |
| | 138 |
| Smelt reduction plant according to the invention | |
| a) reducing agent: coal | |
| Coal: 244 kgs at 70 Sw.Crs./ton | 17 |
| Electric energy: 875 kwh at 0,05 Sw.Crs./ton | 44 |
| Lime (CaO) 110 kg at 60 Sw.Crs./ton | 7 |
| Total costs | 68 |
| b) reducing agent: oil | |
| Oil: 200 kgs at 120 Sw.Crs./ton | 24 |
| Electrical energy: 1080 kwh at 0,05 Sw.Crs./kwh | 54 |
| Lime (CaO) 100 kgs at 60 Sw.Crs./ton | 6 |
| Total costs | 84 |
| c) Natural gas | |
| Natural gas: 314 Nm³ at 0,08 Sw.Crs./ton | 24 |
| Electric energy: 1050 kWh at 0,05 Sw.Crs./kWh | 53 |
| Lime (CaO) 100 kgs at 60 Sw.Crs./ton | 6 |
| Total costs | 84 |

From the calculations above it is obvious that when using coal in the smelt reduction plant according to the invention the cost saving amounts to 70 Sw.Crs./ton of liquid iron. If oil or natural gas is used the cost saving will be smaller, i.e. 54 Sw.Crs./ton of liquid iron.

As stated above this invention is related to reduction of powderous or particulated oxidic ore to molten metal by reduction in two different steps comprising pre-reduction with reducing gas and final reduction with solid, liquid or gaseous reducing agent at a temperature at which the reduced metal and slag is in a molten state. The treated metal oxides should be reducable to a sufficient extent at temperatures which prevent agglomeration or sticking of the oxide or metal in the pre-reduction step when using the gases which after cooling are transferred to the pre-reduction step. Said reducing gases are essentially CO and/or $H_2$ whereas $CH_4$ and other hydrocarbons are of minor importance. The method has been discussed above in combination with the reduction of iron oxide but can also be used for a number of other metal oxides which are more easily reducible or somewhat less easily reducible than iron. In the following a number of such metals and oxides are exemplified.

1. Copper

Copper oxide CuO is more easily reducible than hematite $Fe_2O_3$ at all temperatures up to 1430° C. According to the invention reduction to lower oxides $Cu_2O$ or to metal can be performed in the pre-reduction step at lower temperatures than for iron according to the reactions:

$$2\,CuO + CO \rightarrow Cu_2O + CO_2$$

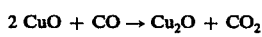

$$2\,CuO + H_2 \rightarrow Cu_2O + H_2O$$

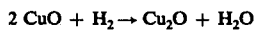

resp.

$$CuO + CO \rightarrow Cu + CO_2$$

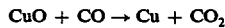

$$CuO + H_2 \rightarrow Cu + H_2O$$

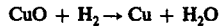

2. Lead

Lead oxide PbO is more easily reducible than magnetite $Fe_3O_4$ at all temperatures. According to the invention reduction of lead oxide to metallic state can be perfomed in the pre-reduction step according to the following reactions:

$$PbO + CO \rightarrow Pb + CO_2$$

$$PbO + H_2 \rightarrow Pb + H_2O$$

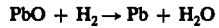

3. Nickel

Nickel oxide NiO is at all temperatures reduced to nickel metal more easily than magnetite $Fe_3O_4$ is reduced to wustite FeO or wustites is reduced to metallic iron. The reaction in the pre-reduction step is according to one or both of the following reactions:

$$Ni_2 + CO \rightarrow Ni + CO_2$$

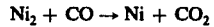

$$NiO + H_2 \rightarrow Ni + H_2O$$

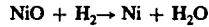

4. Cobolt

Cobolt oxide CoO is more easily reducible than $Fe_3O_4$ up to 1250° C by the same reactions as nickel.

5. Tin

Tin oxide $SnO_2$ is at all temperatures above 400° C. more easily reducible than $Fe_3O_4$ in direct reduction to Fe and at temperatures above 750° C. insignificantly less reducible than $Fe_3O_4$ when reduced to FeO. $SnO_2$ is at all temperatures more easily reducible than wustite FeO when reduced to metallic iron. The reactions are:

$$SnO_2 + 2CO \rightarrow Sn + 2CO_2$$

$$SnO_2 + H_2 \rightarrow Sn + 2H_2O$$

Either of said reactions can comprise the intermediate product SnO, e.g.

$$SnO_2 + CO \rightarrow SnO + CO_2$$
$$SnO + CO \rightarrow Sn + CO_2$$
which gives: $SnO_2 + 2CO \rightarrow Sn + 2CO_2$ 6. Zinc Zinc oxide SnO is at all temperatures below 1200° C. less easily reducible than wustite FeO when reduced to metallic iron. The oxygen potential in the system $2Zn + O_2 \rightarrow 2ZnO$ is at about 1200° C. higher than the oxygen potential in the system $CO + O_2 \rightarrow CO_2$ and at about 1300° C. higher than the oxygen potential in the system $2H_2 + O_2 \rightarrow 2H_2O$. Zinc metal is, however, vapourized already at 900° C. and therefore the reaction:

$$ZnO + CO \rightarrow Zn + CO_2$$

resp.

$$ZnO + H_2 \rightarrow Zn + H_2O$$

will procede from left to right already above 900° C since Zn metal formed by the reaction escapes together with the reduction gases in the vapour state. Thus the process and apparatus according to the invention just as other methods and furnaces for the production of zinc must be provided with condensing means for the collection of liquid zinc.

7. Manganese $MnO_2$ in the first hand but also MnO can be reduced as CO resp. $H_2$ at temperatures which can suitably be used in the pre-reduction step of this process and apparatus. This is based on the fact that the reaction products $CO_2$ resp. $H_2O$ are continuously removed with the reduction gas from the reaction surface of the oxides. The reaction can be written:

$$MnO_2 + CO \rightarrow MnO + CO_2$$
$$MnO_2 + H_2 \rightarrow MnO + H_2O$$

resp.

$$MnO + CO \rightarrow Mn + CO_2$$
$$MnO + H_2 \rightarrow Mn + H_2O$$

Pre-reduction to a sufficient extent by the claimed process and apparatus can be obtained at usable temperatures in the pre-reduction step.

8. Chromium

Chromium oxides are comparable with manganese oxides as regards reducibility. The higher oxide $Cr_2O_3$ and the formed native mineral chromite $FeCrO_4$ can be partially reduced to oxides of lower valency in the pre-reduction step of the claimed process and device at practically useful temperatures. The less easily reducible oxides of manganese and chromium are suitably treated by the process and device according to the invention in mixture with iron oxides which have been pre-reduced in the upper part (pre-reduction part) of the reduction apparatus. The final reduction of iron oxide and reduction of manganese and chromium oxide is then performed in the melt reduction step. CO and $H_2$ formed by the reduction of manganese or chromium oxides with carbon or hydrocarbons are suitably used for the reduction of iron oxide in the pre-reduction step.

I claim:

1. In a device for reducing and smelting metal oxides to a metal melt including a prereduction furnance in which powdery or lumpy metal oxide is prereduced by the introduction of a suitable reducing gas and a final reduction furnance having a heated smelting furnace for final reduction arranged to directly receive the prereduced metal oxide from the prereduction furnance for final reduction of this material with a reducing agent selected from the group comprising coal, oil, natural gas and other solid, liquid and gaseous hydrocarbon-containing materials as a reducing agent, wherein the improvement comprises the device being equipped with means for directly feeding the reducing gas evolved in the smelting furnace used for the final reduction into the lower end of the prereduction furnace, and with means for bringing said reducing gas which is fed from the smelting furnace to the prereduction furnance into contact with a cooling agent selected from the group consisting of gaseous, liquid and solid cooling agents so as to cool the reducing gas to a temperature at which sticking of the metal oxide treated in the prereduction furnance is prevented and simultaneous efficient prereduction with the reducing gas in the prereduction furnace is achieved.

2. A device according to claim 1, characterized in that the smelting furnace is mainly electrically heated.

3. A device according to claim 2, characterized by comprising a smelting furnace for final reduction with refractory lining and roof and a prereduction furnance with a central vertical shaft arranged above and opening into the smelting furnace with multiple hearths arranged for feeding the metal oxide stepwise downwards during which movement the metal oxide is prereduced by reducing gas led in countercurrent to the metal oxide by means of devices arranged in the vertical shaft.

4. A device according to claim 3, characterized by comprising a central vertical shaft with multiple hearths arranged for feeding the metal oxide stepwise downwards and at least two smelting furnaces for final reduction arranged below and surrounding the shaft and connected to the shaft by closed heat-insulated channels for the reducing gas and for the metal oxide.

5. A device according to claim 2, characterized by comprising a smelting furnace for final reduction with refractory lining and roof into which opens a central hood which encloses the discharge end of a rotary furnance for prereduction into which the reducing gas is led in countercurrent to the materials flow through the rotary furnace.

6. A device according to claim 5, characterized by comprising at least two rotary furnaces connected to said hood centrally placed over the smelting furnace for final reduction.

7. A device according to claim 2, characterized by comprising a smelting furnace for final reduction with refractory lining and roof and a prereduction section comprising at least one furnace arranged for prereduction of the metal ore particles in a state in which the particles are agitated by the reducing gas, said device also comprising means for delivering the reducing gas to said at least one furnace with a pressure which is high enough to create the desired agitation of the metal oxide within said prereduction furnace.

8. A device according to claim 2, characterized in that the means for bringing the reducing gas into contact with said cooling agent comprises a first group of means for injecting a cooling agent selected from the group consisting of gaseous, liquid and solid cooling agents which react endothermically with the reducing gas to form an increased molar amount of reducing gases with a simultanesous cooling effect on the gas, and a second group of cooling means arranged after said first group of cooling means in the flow path of the reducing gas from the smelting furnace to the prereuction section, said second group of cooling means being arranged for bringing the endothermically cooled reducing gas into contact with an inert cooling agent which cooles the reducing gas without reacting endothermically with the gas.

9. A device according to claim 8, characterized in that said second group of cooling means comprises a solid cooling means through which heat is removed from the reducing gas to a cooling fluid which passes through at least one conduit in said cooling means.

10. A device according to claim 2, characterized by being provided with control means for automatically adjusting the input of electrical energy and feed of reducing agent, ore and cooling agent so as to maintain a desired temperature, composition and quantity of reducing gas supplied from the smelt reduction furnace to the prereduction section of the device.

11. A improved method of producing molten metal from a metal oxide in powder or lump form, by passing said metal oxide downwardly towards a heated smelting furnace and subjecting the downwardly moving oxide to the action of reducing gases before entry into the smelting furnace, in which the improvement comprises dividing the reduction of the metal oxide to molten metal into a pre-reduction step wherin the downwardly moving oxide is partially reduced in a pre-reduction furnace above the smelting furnace but remains substantially solid, and an end-reduction step wherein the partially reduced substantially solid oxide is converted to molten metal in the smelting furnace, by the following combination of features:

a. the end reduction of the partially reduced substantially solid oxide is effected by feeding into the smelting furnace a reducing agent selected from the group comprising solid, liquid and gaseous carbonaceous and hydrocarbon-containing carbonaceous materials, to produce substantially complete reduction of the oxide to molten metal with evolution of hot reducing gases, b. introducing the hot reducing gases from said smelting furnace upwardly to the discharge end for the downwardly moving oxide, of the pre-reduction furnace and c. cooling said hot reducing gases substantially before or at the region of introduction thereof by bringing the hot reducing gases into contact with at least one cooling agent, selected from the solid, liquid and gaseous cooling agents, adapted both to produce a lower temperature of the hot reducing gases sufficient to prevent agglomeration of the pre-reduced substantially solid oxide before it enters the smelting furnace, and also to provide an increase in the molar amount of reducing gases available for the pre-reduction step by an endothermic reaction with the hot reducing gas.

* * * * *